Jan. 27, 1959

W. ROEPKE

DEVICE FOR MAGNETICALLY RECORDING AND REPRODUCING SOUND

Filed Aug. 18, 1952

2,871,019

Inventor:

Willi Roepke 2,871,019

DEVICE FOR MAGNETICALLY RECORDING AND REPRODUCING SOUND

Willi Roepke, Berlin-Steglitz, Germany, assignor to Loewe Opta A. G., Berlin-Steglitz, Germany, a German company Application August 18, 1952, Serial No. 304,981

Claims priority, application Germany August 20, 1951

5 Claims. (Cl. 274—4)

Figure 1:
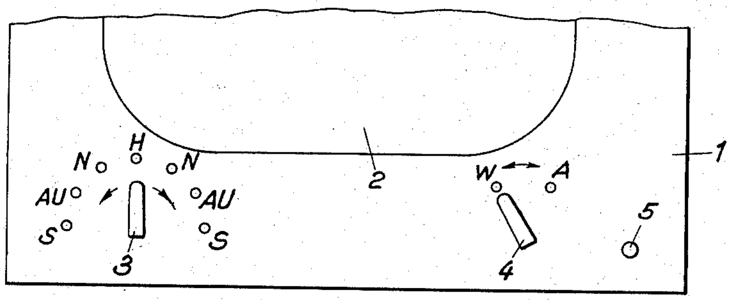

In devices for magnetic sound recording and reproducing particularly the following means of control must be provided on a control panel:

One change-over switch for either "recording" respectively "reproduction" (switch for controlling the manner of operation), One switch for regulating the direction and speed of the tape travel (switch for tape travel control).

The operating person who in many cases will be a layman has to pay attention to avoid as much as possible errors in switching and operating. Such a wrong switching operation would be e. g. the changing of tape travel direction or the transition to high-speed travel during the recording operation. In this case, the whole record hitherto impressed would be completely destroyed and one would have to begin a new record. If, however, the device would be switched over to "reproduction," this wrong switching operation would practically cause no damage as, at the worst, in this case the reproduction of the record would be distorted or inarticulated, whereas the sound carrier itself would not be submitted to any impairment.

Therefore, it is the purpose of the present invention to provide automatically acting means for rendering practically impossible errors in switching of the type mentioned before at devices for magnetic sound recording and reproduction.

According to this invention, the switch for controlling the manner of operation ("recording" and "reproduction") is mechanically connected with the switch for tape travel control in such a maner that, during "recording," the switch for tape travel control is locked for all its movements with the only exception of those directed towards the position "stop." According to the invention this will be accomplished by a movable bar between these two switches which is preferably designed as a two-armed lever. The position of the one end of this bar depends on the corresponding position of the switch for controlling the manner of operation whereas at the other end of this bar a locking member, e. g. a locking disc, for the tape travel control switch is provided. This locking disc preferably consists of a disc with radial notches which in their arrangement along the periphery correspond to that of different positions provided at the control panel of the base plate ("stop," "normal speed," "normal speed with automatic reversal," "high speed"). For this purpose the coupling bar is designed and arranged in such a manner that, at the same time, it effects also the locking of the switch for controlling the manner of operation itself; this locking action is only released if, at the same time, a safety knob is actuated which is suitably arranged near the switch for controlling the manner of operation. Thus, this knob has the following tasks:

At first, it releases the rotational movement of the switch for controlling the manner of operation, furthermore it renders possible the switching-over of the switch for tape travel control from its position "stop" to the position "normal speed" or "normal speed with automatic reversal." Said knob is arranged in such manner as to be acted by one hand of the user during the action of the said switches for manner of operation and for tape movement effected by his other hand.

The principal idea of the present invention will best be described in connection with the annexed drawing which simultaneously shows different further constructional means and developments of the principal idea of this invention. Figs. 1–4 are designed on a reduced scale, Figs. 5–7 on an enlarged one; the relative dimensions being chosen, for clearer representation of the essential components, somewhat different from the actual design. Besides that, those parts which do not essentially belong to the principal idea of this invention or to its further developments are omitted in the drawing for clarity's sake.

Figures 2, 3, 4, 5, 6:
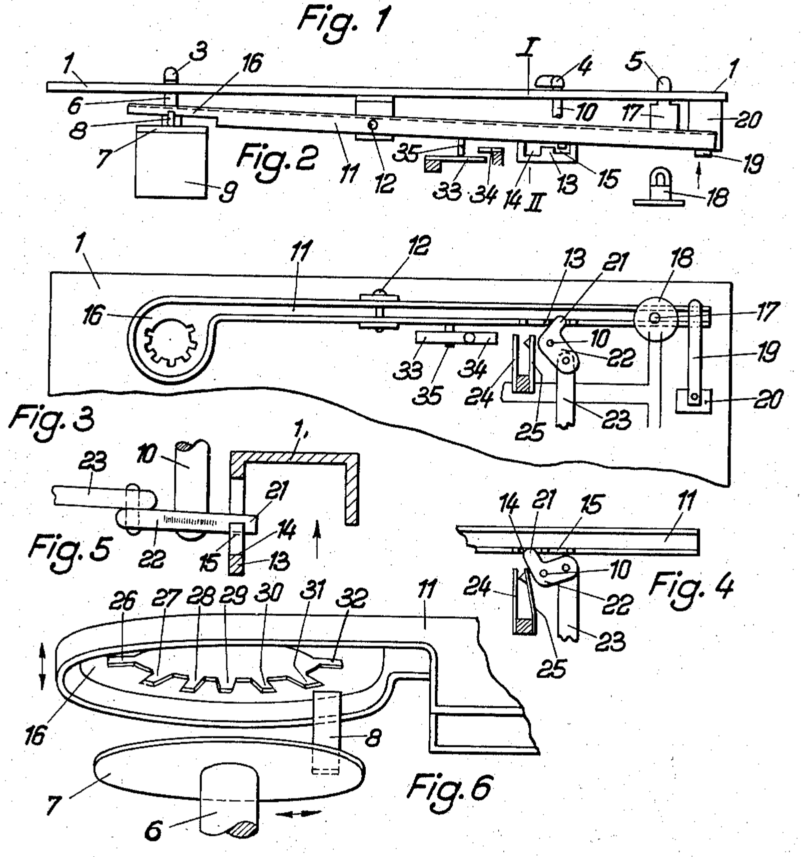

The different figures of the drawing show:

Fig. 1, a top view of the control elements of a control panel which is provided e. g. with an oval container housing the wind-up reel and the wind-off reel;

Fig. 2, a front view of this control panel showing the elements arranged below this panel;

Fig. 3, a top view of the lower surface of the control panel which has been once more turned around by an angle of 90°;

Fig. 4, some of the components connected with the switch for controlling the manner of operation, but in another operational position than that shown in Fig. 3.

Fig. 5, section I—II of Fig. 2, on an enlarged scale;

Fig. 6, an enlarged drawing of the locking element at the switch for tape travel control.

Figure 7:
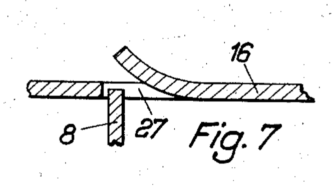

Fig. 7, a detail of this locking element at the switch for tape travel control.

According to Fig. 1, the base plate and control panel of a magnetic device for sound recording and reproduction is designated with 1, the reel container for the magnetic tape, which can be attached to this plate, with 2. At the foremost part of the control panel 1 two switches 3 and 4 are arranged. Switch 3 serves for controlling the motion of the magnetic tape and is provided, besides its central position H (stop), with the position N (normal speed), AU (automatic reversal after the tape has finished its travel), and S (high speed tape travel), these latter three positions being arranged twice on a semicircle on both sides of the central position H. Hereat, the three positions on the left side of H are provided for one direction of tape travel, those on the right side for the other one. Switch 4 can be switched into two positions: W (reproduction) and A (recording operation). The two switches 3 and 4 are preferably designed as lever switches but they can be designed, too, as button switches or by other known means. Part 5 in Fig. 1 shows the safety button the task of which is described in detail in connection with Fig. 2.

Fig. 2 shows a front view from which the locking elements provided at the lower surface of the control panel 1 can be recognized in detail; the axle of the switch for tape travel control 3 is designated with 6; it leads to a change-over switch 9 which is shown only schematically and the task of which is the accomplishment of the usual connections to motor circuit and the amplifier circuit in order to realize the different manners of operation in both directions of tape travel. The movable part of this switch 9 is provided with a plate 7 on which a tongue-shaped projecting part 8 is mounted. This projecting part 8 is in front of one of the radial notches of the locking disc 16 which represents one end of the coupling bar 11. The purpose proper of this coupling bar 11 is the accomplishment of an at least partial locking of the switch for tape travel control 3 in conformity with the position of the switch 4 for controlling the manner of operation, particularly in its position "recording." The single elements for this locking action are shown not only in Fig. 2 but also in Figs. 3–7.

The coupling bar 11, which suitably has an inverted U-section, is pivoted on 12, the pivoting axle being connected with the base plate 1 by means of brackets or the like. Bar 11 is provided with a part 13 which is arranged oppositely to the switch for controlling the manner of operation 4 (see particularly Fig. 5); this part 13 is provided with two notches 14 and 15; seen in the direction of the axle of switch 4, one of these notches (14) has a greater distance from the base plate 1 than the other one (15). These two notches have to provide, firstly and normally, the locking of the rotational movement of the axle 10 of the switch for controlling manner of operation of switch 4; in Fig. 2 only the upper part of this axle is shown. The means for this locking action consists particularly of a component 22 which can be recognized from Fig. 3 and which is rigidly connected with the axle 10 of the switch 4; member 22 is provided, on that side opposite to the notches 14 and 15, with a projecting part 21. The other end of the part 22 is pivoted on the rod 23 leading to the operating switch proper which effects particularly the changes of the electrical circuit connections when switching from recording to reproduction or vice versa. The safety knob 5 projecting through the base plate 1 is provided at its lower part with a collar 17 adjacent to the bar 11 and protecting the knob from dropping down.

At the same time, the two notches 14 and 15 are arranged in such a manner that the bar 11, owing to spring 19 fixed at member 20 and pressing the right arm of bar 11 towards base plate 1, comes into contact with the projecting part 21. If the latter is in the position of Fig. 2 or Fig. 3, i. e. in the position of "reproduction," the edge of the notch 15 is in contact with the projecting part 21. This means that the locking disc 16 provided at the other arm of bar 11 is kept in such a position that the projecting member 8 of the switch plate 7 is not engaged into one of the radial notches of the locking disc 16.

If, however, the switch 4 is in its position of "recording," part 22 connected to its axle 10 comes into the position recognizable from Fig. 4; in this case the projecting part 21 is in such a position that now (cf. also Fig. 2) the outside edge of notch 14 in part 13 comes into contact with it. This means that in Fig. 2 the left arm of bar 11 with its locking disc 16 is somewhat lowered in the direction towards switch plate 7; the projecting part 8 of this plate 7 engages into one of the radial notches of the locking disc 16 thus preventing any rotation of plate 7 and consequently of the operating knob of switch 3.

Fig. 5 shows, on an enlarged scale, the components described in connection with Figs. 2–4, in particular part 13 of the bar 11 and the axle 10 of switch 4 with its part 22 and the projecting part 21. In this position the top edge of notch 15 is in contact with the projecting part 21 owing to the spring pressure acting upwards in the direction of the arrow (position of "reproduction"). In the other position of the projecting part 21 ("recording") the edge 14 of part 13 of the bar 11 would come into contact with part 21 owing to the same spring pressure thus moving the locking disc 16 at the other arm of the bar 11 towards the switch plate 7 in the manner already described before.

From the enlarged drawing of the locking disc 16 in Fig. 6 particularly the arrangement of the radial notches 26—32 can be recognized which correspond to the marks around switch 3 on the control panel 1 as shown in Fig. 1. If the locking disc 16 is in its open i. e. lifted position, the projecting part 8 on the switch plate 7 is out of contact with these notches. If, however, switch 4 has been switched to the position A ("recording"), the locking disc 16 is lowered and the projecting part 8 engages into one of the notches thus preventing any further rotation of switch plate 7.

Attention must be paid to preventing any movement of switch 3 from its position "stop" towards its running positions without, however, preventing its movement from one of the running positions towards the position "stop." For accomplishing this, the radial notches corresponding to the running positions "normal speed" respectively "normal speed with automatic reversal," i. e. the notches 27 and 28 and 30 and 31 are designed so that their edges are not sharp on both sides but that one of the edges, as shown in Fig. 7, is inclined upwards by stamping out a corresponding tongue. In this case the projecting part 8 can be stopped by the locking disc 16 only at a movement from the right to the left but not at a movement from the left to the right corresponding to the return movement of the switching knob 3 to its position "stop."

Further components of this invention will be described now: In order to call the operator's attention to the fact that special care is necessary during recording for achieving a faultless record, a signal lamp 18 is provided which is switched-on e. g. by the two contacts 24, 25 (see Fig. 3 and Fig. 4), as soon as the switching knob 4 is turned from its position "reproduction" to the position of "recording." This signal lamp 18 can be mounted either on the control panel 1 or in axial direction behind the safety knob 5 which in this case must be made of Plexiglas or the like.

Furthermore, another pair of contacts 33, 34 is provided (see Fig. 2) which is moved, either by the bar 11 itself or by a pin fixed at it, in such a manner that the amplifier or loudspeaker is switched-off as soon as the knob 5 is pressed downwards.

The device is operating in the following manner: If switch 4 is in the position of "reproduction," switch 3 can be moved, owing to the lifting of the locking disc 16, from its position "stop" into each of the other positions in both directions and back. If the device shall be switched from "reproduction" to the position of "recording," one must at first press down the safety knob 5; thus the projecting part 21 is released and switch 4 can be turned into the other position. At the same time, the switch for tape travel control 3 must be turned into its position "stop." As soon as the recording operation shall begin, the switch 3 is moved into the position "normal speed" or "normal speed with automatic reversal"; in this case, too, the knob 5 must be pressed down with regard to the locking position of the disc 16. Now the recording operation can take place. If for any reason this operation shall be finished, this can be achieved not only by switching off a main switch but also by moving back switch 3 from the position N or AU into its position H; this can be done owing to the design of the notches in the locking disc 16 shown in Fig. 7. A further movement of switching knob 3, however, into one of its running positions is now impossible without another pressing down of knob 5.

I claim:

1. A magnetic tape sound recording and reproducing device containing an operation switch for two operating positions "recording" and "reproducing," and a turntable tape movement switch for several tape movement positions "stop," "normal speed," "rapid speed," and a two-arm-lever swingably mounted on a fixed part of said device, the first arm of said lever containing a number of cams circumferentially arranged near and around the axis of said turntable tape movement switch, the radial edges of said cams being in engagement with a projecting pin connected with said tape movement switch axis, and preventing said pin from being moved in the switching direction from "stop" to "normal speed" and to "rapid speed," the second arm of said lever being connected with a knob pressable towards said lever, thereby removing said first lever arm and its cams from the position engaging with said projecting pin, and a part of said operation switch being arranged opposite an edge of said swingable lever near said knob and preventing, in its position "recording," the movement of said knob in the direction of disengagement of said cams from the projecting pin of said tape movement switch, and to release, in its position "reproducing," the movement of said lever.

2. A magnetic tape sound recording and reproducing device according to claim 1, in which said cams are arranged on a disc forming the end of said first lever arm and lie perpendicularly to the axis of said tape movement switch.

3. A magnetic tape sound recording and reproducing device according to claim 2, in which the radial edges of said cams which lie—in relation to the rotation of said tape movement switch—behind the other radial edges of said cams are bent away from said projecting pin as to permit a movement of said tape movement switch in the direction from "rapid speed" to "normal speed" and to "stop" is each position of said swingable lever.

4. A magnetic tape sound recording and reproducing device according to claim 1, in which said knob is made of a translucent material and a lamp is arranged—seen in the direction of the user's view—behind said knob, and an electric switch is coupled with and controlled by said operation switch as to connect said lamp with a current source during the position "recording" of said operation switch.

5. A magnetic tape sound recording and reproducing device according to claim 1, in which one end of a spring is mounted on a fixed part of said device, the other end of said spring being in mechanical contact with one arm of said swingable lever and pressing it into the position in which said cams are in engagement with said projecting pin connected with said tape movement switch axis.

References Cited in the file of this patent

UNITED STATES PATENTS

| | | |
|---|---|---|
| 650,010 | Heller | May 22, 1900 |
| 1,902,700 | Hadano | Mar. 21, 1933 |
| 2,535,498 | Kornei | Dec. 26, 1950 |
| 2,572,596 | Camras | Oct. 23, 1951 |